(12) United States Patent
Mietke

(10) Patent No.: US 11,288,263 B2
(45) Date of Patent: Mar. 29, 2022

(54) CHANGE SERVICE FOR SHARED DATABASE OBJECT

(71) Applicant: SAP SE, Walldorf (DE)

(72) Inventor: Sebastian Mietke, Wiesloch (DE)

(73) Assignee: SAP SE, Walldorf (DE)

( * ) Notice: Subject to any disclaimer, the term of this patent is extended or adjusted under 35 U.S.C. 154(b) by 251 days.

(21) Appl. No.: 16/554,950

(22) Filed: Aug. 29, 2019

(65) Prior Publication Data
US 2021/0064602 A1    Mar. 4, 2021

(51) Int. Cl.
*G06F 7/00* (2006.01)
*G06F 17/00* (2019.01)
*G06F 16/23* (2019.01)

(52) U.S. Cl.
CPC ...... *G06F 16/2379* (2019.01); *G06F 16/2358* (2019.01)

(58) Field of Classification Search
None
See application file for complete search history.

(56) References Cited

U.S. PATENT DOCUMENTS

| | | | |
|---|---|---|---|
| 2009/0282125 A1* | 11/2009 | Jeide | H04L 67/1095 709/217 |
| 2013/0013921 A1* | 1/2013 | Bhathena | H04L 63/0471 713/168 |
| 2014/0047140 A1* | 2/2014 | Otenko | G06F 9/5027 710/54 |
| 2016/0232200 A1* | 8/2016 | Sherman | G06F 16/2379 |

* cited by examiner

*Primary Examiner* — Tuan A Pham
(74) *Attorney, Agent, or Firm* — Buckley, Maschoff & Talwalkar LLC

(57) ABSTRACT

Provided is a system and method for managing change requests to a shared data object. In one example, the method may include receiving a request to change a value of a shared data object stored in a data store, identifying a queue of the shared data object which stores change requests before processing, generating an entry for the request comprising a timestamp of the request, the change in the value, and an identifier of the shared data object, and storing the generated entry in the queue of the shared data object, where the generated entry is stored in a position of the queue based on the timestamp. Thus, a user does not need to wait for other users to finish accessing the shared data object. Instead, a user waits for a queue entry to be created, thus decreasing the wait time.

18 Claims, 7 Drawing Sheets

FIG. 3

| Change Key | Value Change | Process ID | Timestamp |
|---|---|---|---|
| Budget A | -100 | P1234 | 19.03.2018 10:32:38 |
| Budget A | +250 | P1155 | 19.03.2018 10:32:44 00000 |
| Budget A | -300 | P0916 | 19.03.2018 10:32:44 00001 |
| Budget B | -25 | P3007 | 19.03.2018 10:32:50 |
| Budget B | -80 | P0482 | 19.03.2018 10:32:52 |
| Budget A | -155 | P2187 | 19.03.2018 10:32:53 |
| Budget B | +1000 | P0075 | 19.03.2018 10:32:56 |
| Budget B | -180 | P2187 | 19.03.2018 10:33:02 |
| Budget B | -460 | P0075 | 19.03.2018 10:33:04 |

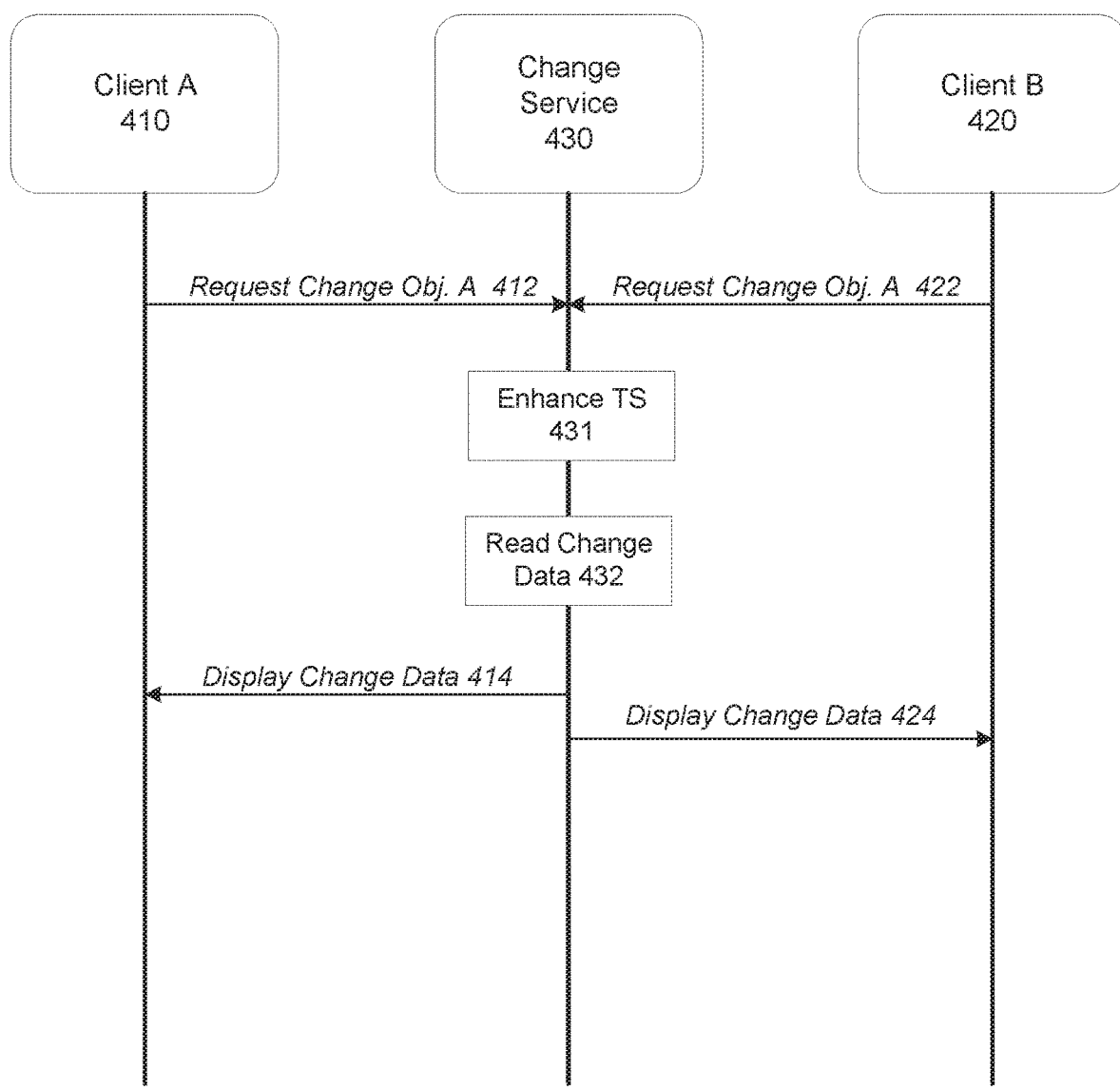

FIG. 4B

| Client B | |
|---|---|
| Budget A | + 500 |
| Budget A | - 100 |
| Budget A | + 250 |
| Budget A | - 300 |
| Budget A | -155 |
| Total | + 96 |
| Requested Change | -115 |

| Client A | |
|---|---|
| Budget A | + 500 |
| Budget A | - 100 |
| Budget A | + 250 |
| Budget A | - 300 |
| Budget A | -155 |
| Total | + 195 |
| Requested Change | -99 |

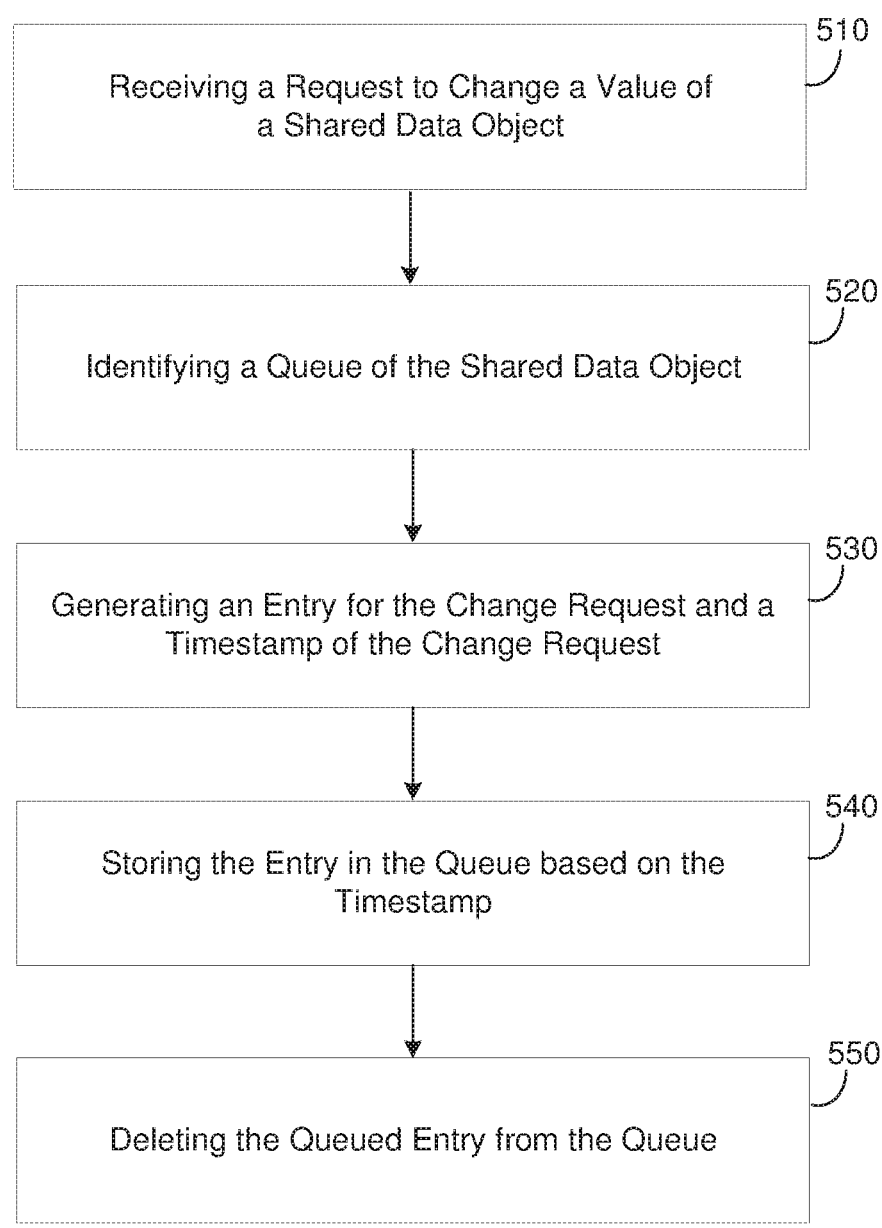

CHANGE SERVICE FOR SHARED DATABASE OBJECT

BACKGROUND

In a database environment, multiple users can simultaneously execute database transactions. In this scenario, when multiple transactions are executed at the same time there is a chance for a conflict (e.g., conflicting data values saved at different places, etc.) which can leave the database with an inconsistent state. Concurrency control is used to address such conflicts and enable transactions to be performed concurrently without violating the integrity of the data.

Lock-based protocols are one of the primary mechanisms by which a database implements concurrency control. The lock-based protocol essentially locks a process to a data object and prevents another process from performing a write transaction until it acquires an appropriate lock on the data. An exclusive lock remains in place until the transaction holding the lock issues a commit or a rollback. Afterwards, the data can be locked again by another process. However, one of the drawbacks of the exclusive lock is that only one user (process) is able to work on the data at a time while the other users must wait. Furthermore, when a second process attempts to access a data object currently being accessed by a first process, the second process may be denied. In this instance, the second process must submit another lock request. During this period, a third process may request receive access to the desired data object prior to the second process while the second process resubmits its request.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 3 is a diagram illustrating a queue storing entries of requested changes to a shared database object in accordance with an example embodiment.

FIGS. 4A-4B are diagrams illustrating a process of displaying changes requests of a shared database object in accordance with an example embodiment.

FIG. 5 is a diagram illustrating a method of managing access to a shared database object in accordance with an example embodiment.

Figure 1:
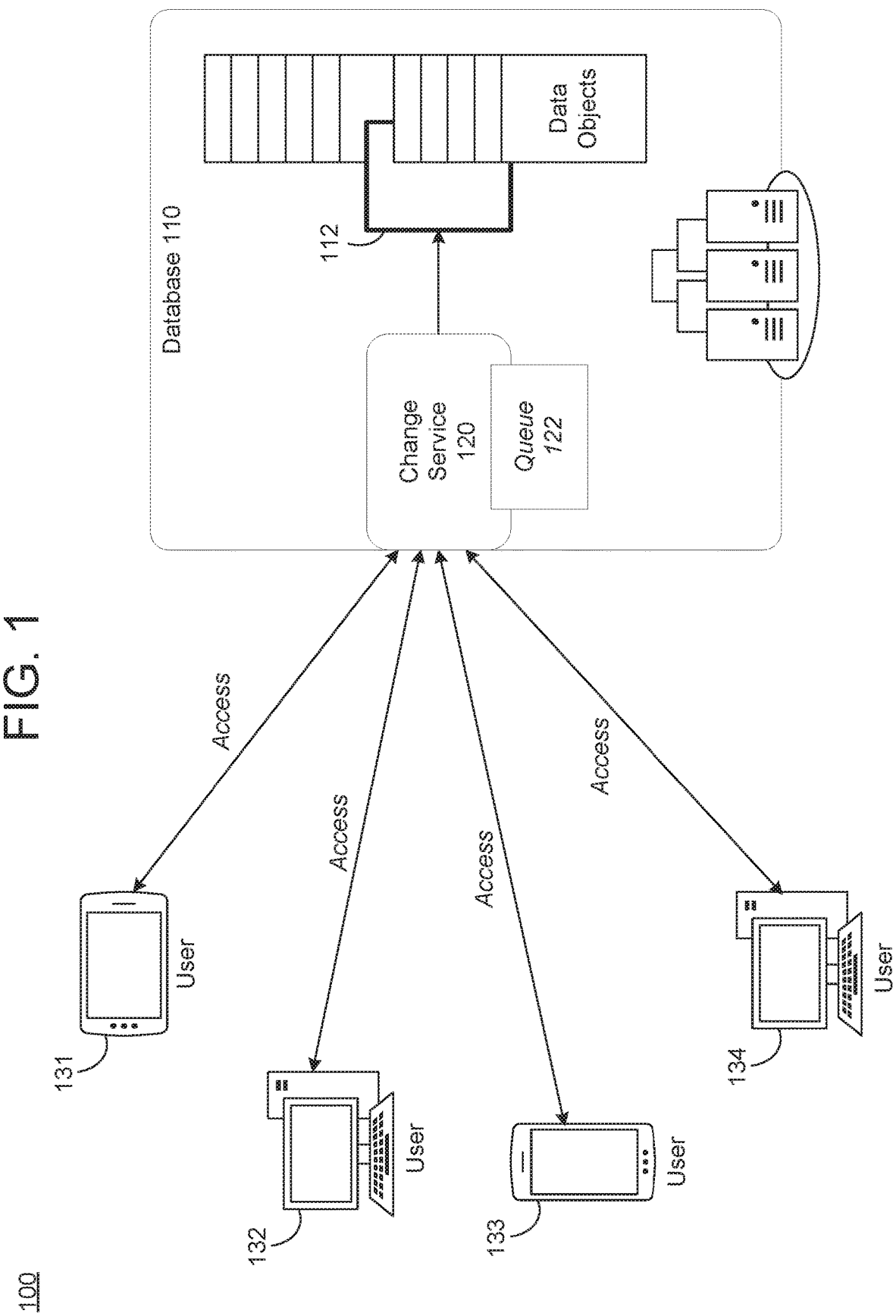
FIG. 1 is a diagram illustrating a system of users sharing access to database objects in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

The example embodiments are directed to a change service which manages access to a shared data object (e.g., business object, table, row, column, blob, page, etc.) within a database environment where multiple users share access to the data object. Rather than a process/transaction implementing an exclusive lock on a shared data object (and holding up other users/processes), the change service can identify a change to be made to the data object, and store the change in a temporary queue. For example, the change service may create and store an entry representing the change in a queue, where the change request can be processed at a later time (after any previous queued changes are finished processing). This allows the process that requested the change to continue working almost uninterrupted even when the data object is being changed by another process. Furthermore, the requesting process does not need to wait for the change to be implemented and may continue to perform additional operations. In other words, the user/process requesting the change that has yet to be processed (still in the queue) may continue to work uninterrupted as if the change has already been processed.

An application associated with the request may determine, in advance, whether a requested change to a value of the shared data object will violate any conditions or constraints of the value of the shared data object (e.g., a change cannot be more than an available budget value, etc.). Meanwhile, the change service may generate an entry which includes information about the requested change, for example, a timestamp (or an enhanced timestamp as further described below), an object key which identifies the shared data object, a change in value (e.g., an amount of change, negative, positive etc.), a process ID, and the like, and store the entry in the temporary queue. This entry may be stored regardless of whether the change service determines the change is capable of being performed. For a change that is allowed, it will be processed when it reaches the end of the queue and deleted from the queue. For changes that are not allowed, they will be deleted from the queue without being performed. As another example, the process requesting the change ends or terminates, the change request associated with the process may be deleted from the queue. When the top entry in the queue is processed and deleted, the queue may move the remaining requests (entries) up in the queue.

When multiple processes attempt to access the same data object and change a value thereof, the corresponding transactions can be ordered in the queue based on the timestamps at which they were received. When two processes simultaneously (same timestamp) request access to the data, the change service may break the tie and place one of the requests ahead of the other. This may be performed randomly, etc. Here, the order may be distinguished by an enhanced timestamp which includes a counter value added by the change service. The queue may be a first-in first-out queue where the oldest request is the next to be processed and the most recent request is the last entry in the queue. When the database is ready to process the next request, the oldest request may be retrieved based on the entry in the queue and processed accordingly to change the value to the shared data object. Furthermore, the other entries in the queue may be moved upward (ahead) in the queue based on the oldest entry being removed. This process may be repeated until all change requests are processed. Furthermore, the users executing the processes which are working on the shared data object may continue to work on other data even though the change in the database has not taken effect because the change service has approved the change.

As an example, two users may be executing processes which depend on a common underlying data object such as a business object. For example, the business object may be a budget business object storing a current value for a budget shared between the two executing processes. The two process may not depend on each other directly but both may be able to make changes to the budget simultaneously. Rather than lock the business object with an exclusive lock, the change service can order requested changes in a queue which prevents the business object from being locked. As a result, other processes may also access the business object without being turned down because of an exclusive lock. This can improve efficiency and performance on the system.

In this example, the budget business object may have a constraint which specifies the value for the budget is not to fall below $0. User A may create a request for a purchase order through a process A. The purchase order may cause a decrease in the budget. Likewise, user B may create a request for ordering supplies through process B. The supplies order may also cause a decrease in the budget. Here, the change service may receive the request from process A and process B, and assign each of the requests a respective timestamp. The request with the earliest timestamp may be processed first. Assume in this example that user A sent the purchase order request 5 seconds before user B sent the supplies order request. The change service may identify a change in value to the shared data object (budget), a key of the shared data object on the database (Budget_A), and a process ID associated with the request. Likewise, the change service may perform the steps for the supplies order request from user B. The result may look like the following table.

| Timestamp | Key Object | Value Change | Process ID |
|---|---|---|---|
| 21.08.2019 9:36:12 | Budget_A | −150 | Process A |
| 21.08.2019 9:36:17 | Budget_A | −225 | Process B |

In this example, since the request from process A/user A is received first, the change service evaluates whether the change in value to the budget as a result of the purchase order request from process A is acceptable based on the current value of the budget. If the budget currently sits at a value of $400, then the requested change from user A will be accepted (400−150=250). Since the change is approved, the change service may generate a queue entry for the change request and store the queue entry in a queue where it waits to be processed by the database. Meanwhile, the change service will also evaluate whether the change in value to the budget as a result from the supplies order request from user B is acceptable. In addition to the current value (400), the change service will examine any prior change requests which are already present in the queue. Since the change request from process A is pending (−150), the change service will consider the current value of the budget (400), the allowed change from process A (−150), and the requested change from process B (−225). In this case, the change requested by process B is also accepted (400−150−225=25). As a result, the change service may generate another queue entry for process B and store the entry in the queue after the entry for process A.

Meanwhile, both user A and user B can continue to execute processes A and B, respectively, without having to wait for the value to be written to the database. Instead, both user A and user B can continue to execute process A and process B as if the change has been approved/written to the database while the entry still sits in the queue. This enables a more efficient processing time for both user A/process A and user B/process B.

As an example, there might be multiple users, creating different purchase orders and the overall budget mustn't be exceeded. The purchase orders are not directly depending on each other. There is only one boundary condition, that the overall amount is not higher than the available budget. Accordingly, the particular budget is not locked. Instead it is checked, if different purchase orders can be executed, without exceeding the budget. If the budget is exceeded, the exceeding purchase order and possibly later ones that also exceed the budget, will be cancelled depending on the amount. With this, multiple users can process their purchase orders in parallel and users are not blocking each other from accessing the underlying data object.

FIG. 1 illustrates a system 100 of users 131-134 sharing access to database objects stored in a database 110, in accordance with an example embodiment. Referring to FIG. 1, the users 131-134 correspond to user devices, for example, a workstation, a personal computer, a laptop, a mobile phone, a tablet, and the like. The users 131-134 may access various applications from a web server, a private network, an on-premises server, and the like. The applications may retrieve data from the database 110. Here, the database 110 includes data object which may include tables (row, columns, etc.), blobs, pages, etc. The data objects may store a most current version of a data value or a plurality of data values. The users 131-134 may each read and write data from the data objects stored in the database 110. As a result, one or more of the data objects may be shared in that the users 131-134 can simultaneously access (read/write data) stored in the data object.

To prevent the users 131-134 from creating an inconsistent state in the database 110, such as conflicting changes being made a value of a data object, a change service 120 can control access to the data objects. For example, when multiple users attempt to access a data object 112 at the same time, the data object 112 may not be directly accessible/writeable to a user. In this case, the change service 120 may prevent an inconsistent state from occurring without requiring an exclusive lock on the data object 112. For example, the change service 120 may generate entries corresponding to received change requests for the shared data object 112, identify a queue 122 associated with the shared data object 112, and store the entries in the queue 122 for future processing. The queue 122 may store database transactions, prior to being applied to the shared data object 112. The database 110 may process the oldest remaining entry in the queue 122 until all change requests have been cleared.

When a user makes a request to change the data object 112 while it is currently being changed by another user, the change service 120 can store the requested change in the queue 122. Furthermore, when the requested change reaches the end of the queue 122, it may be processed by the application. To verify whether the change is acceptable, the application may perform a check and retrieve a current value of the data object to determine whether the change is acceptable. Here, the application may identify constraints of the data object which may be stored in metadata of a data object, a table, or the like. Furthermore, the queued entry may be deleted from the queue 122 by the change service 120 when it reaches the end of the queue 122 regardless of whether the application allows the change to be implemented to the shared data object 112. That is, the queued entry may be deleted even when the change is not performed by the application. As another example, if the process which requested the change ends or otherwise terminates, the change request associated with the finished process may also be deleted from the queue 122.

Figure 2:
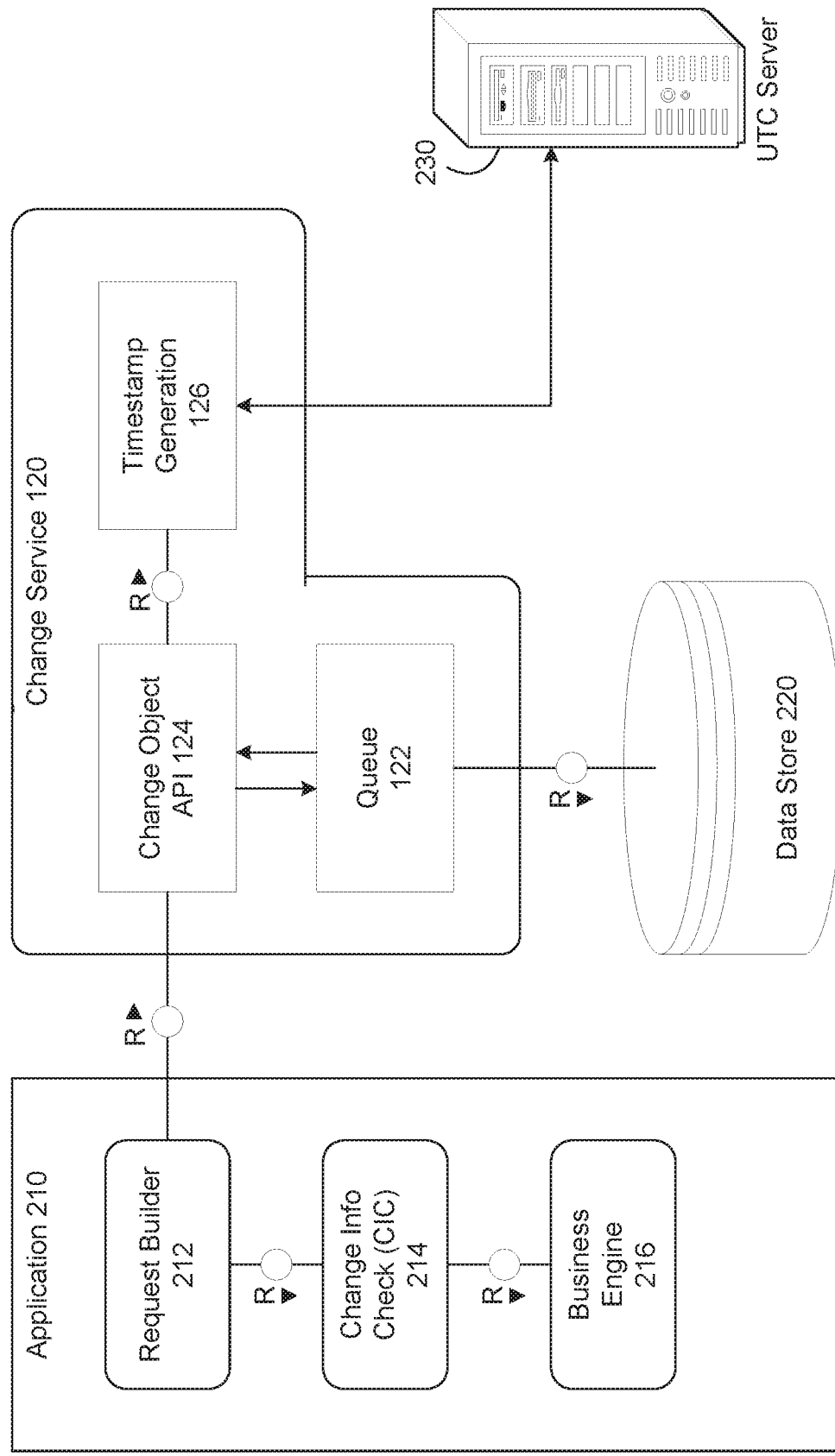
FIG. 2 is a diagram illustrating an architecture of a change service controlling access to a shared data object in accordance with an example embodiment.

FIG. 2 illustrates an architecture 200 of a change service 120 controlling access to a shared data object stored in a data store 220, in accordance with an example embodiment. Referring to FIG. 2, the architecture 200 includes a client application 210 accessing the change service 120 to make changes to a shared data object. When the application 210 requests a change to a data object stored in the data store 220 which is shared among multiple processes, the change in value (together with an identifier/token) are sent to the change service 120. Referring again to the example of a shared budget data object, the shared information may represent the remaining budget. The change information might be "BUDGET_A" (as a key identifier of the object) and "100 EUR" as an identifier of the change in the value of the object. In addition, an identifier of the process requesting the change may be "PO_1234" corresponding to the purchase order process making the request. For example, this request may be built by a request builder 212 of the application 210 and sent to the change service 120 via a change object application programming interface (API) 124 of the change service 120.

In response to receiving the request, the change service 120 may store an entry representing the change request in the queue 122 along with a timestamp identifying a point in time at which the change request is received. For example, a timestamp generation component 126 may assign the queue entry an enhanced timestamp based on time synchronization that is performed with a time-based service such as a server 230 in order to synchronize the time of the change service 120 with coordinated universal time (UTC). The enhanced timestamp may uniquely identify the change request to the change service 120 even when two change requests are received at the same time. For example, the timestamp generation component 126 may add a counter (e.g., one or more extra digits, etc.) to a timestamp to differentiate two or more timestamps received at the same time. This enhancement may be considered to be a counter in general.

For example, when two simultaneous requests are received by the change service 120, and a simple timestamp is used, it would be impossible to determine which requested change should be processed first. To solve this issue, the timestamp generation component 126 may create an enhanced timestamp which includes an additional counter value. If two or more requests arrive within the very same time (e.g., second, millisecond, etc.) the requests can be ordered, for example, randomly. Afterwards, the counter is set, representing an order of the simultaneously received requests.

In some embodiments, the change service 120 may provide information about other pending change requests. For example, if the change information request has been sent successfully, all previous requests of other users/applications that are present in the queue 122 for a same data object (key identifier) may be sent back to the application 210 as response. An example of the providing change request information in response is further described with respect to the examples of FIGS. 4A and 4B. When a response is received by the application 210 and it includes other change requests to be processed before the change request that is sent by the client application 210, a check may be performed by the change information check (CIC) component 214 of the application 210 to determine if the changes are consistent (compatible with each other). If the check succeeds, further processing may be executed. Otherwise, the further processing may be cancelled. In both cases, the change information is requested to be removed from the change service 120. In the example of FIG. 2, the business engine 216 represents the application logic.

Each change request from an application 210 may be performed synchronously. In addition, the value of the data object stored in the data store 220 may not be updated with the requested change until the queue entry corresponding to the change request has worked its way through the queue 122 and is the oldest entry left in the queue 122. The change service 120 may arrange the change requests in an order within the queue 122 based on the enhanced timestamps. Here, the queue 122 may be a first-in first-out (FIFO) queue, or the like. The requests may be processed one by one. Hence the approach requires synchronous processing. However, instead of an exclusive lock from a specific user which is set for the duration of the overall process, the change request can be put into the queue 122 where it waits until all previous entries (having previous timestamps) have been processed. In addition, the user only waits until the enhanced timestamp has been created which happens on microsecond basis for each concurrent purchase order instead of having to wait until the concurrent purchase orders themselves have been processed. In contrast, if the data were to be exclusively locked and the user tries again later, the data could be locked again by another different user. This cannot happen with the change service 120 because all transactions are given an enhanced timestamp and queued.

FIG. 3 illustrates an example of a queue 300 storing entries of requested changes to a shared database object in accordance with an example embodiment. Referring to FIG. 3, each entry in the queue 300 includes a key identifier 310 identifying a data object which is to be changed, a change in value 320 to the data object, a process ID 330 requesting the change, and a timestamp 340. In this example, the timestamp 340 may be an enhanced timestamp in which the date and time of the timestamp 340 is enhanced with an additional counter value 341 to distinguish between two timestamps having a same value for date and time. It should also be appreciated that other data elements may be stored in the queue 300, and the embodiments are not limited thereto.

In the example of FIG. 3, the entries represent change requests received from different processes for access to two different objects (Budget A, Budget B). The data object to be changed may be identified with a common key identifier of the data object which is known throughout the database. In addition, the change value 320 may provide a plus/minus change in value of a numerical amount of a current value of the data object. Meanwhile, the process ID 330 may identify which process/user is requesting the change. Based on the order in which the requests are received (as evidenced by the timestamp 340), the change service may arrange the entries within the queue 300. For example, the most recently received request may be stored at the end of the queue 300 (P00075), while the oldest received request (P1234) may be stored at a front of the queue 300 and is next in line for processing by the database.

FIGS. 4A-4B illustrate a process 400 of displaying changes requests of a shared database object in accordance with an example embodiment. In the example of FIG. 4A, two client applications represented as client application A 410 and client application B 420, generate change requests for a shared data object at the same time. In this example, a change service 430 receives a change request 412 from client application A 410 and a change request 422 from client application B 422, simultaneously. In 431, the change service 430 generates an enhanced timestamp for each of the change requests 412 and 422, and stores an entry for each of the change requests 412 and 422 in a queue (not shown). Since both the change requests 412 and 422 are received at the same time, the change service 430 must create an order among the two requests to distinguish them. In this example, the change service 430 randomly chooses to order change request 412 ahead of change request 422, and assigns a corresponding counter value to each of the respective timestamps for change requests 412 and 422.

Once ordered, the change service 430 may evaluate change request 412 ahead of change request 422. Because change request 412 is given priority over change request 422, the change service may not provide information about change request 422 to the client application A 410, but may provide information about the change request 412 to the client application B 420. In this example, the change service 430 may generate and provide a display of other change requests in the queue to the respective client applications A 410 and B 420. Here, the change requests 412 and 422 request additional changes to data object Budget_A as shown in FIG. 3. In 414, the change service 130 may generate and display a list of change requests from the queue which are to be performed on the data object before change request 412 as shown in FIG. 4B. Likewise, in 424, the change service 130 may generate and display a list of change requests from the queue which are to be performed on the data object before change request 422 as also shown in FIG. 4B. Here, the output in 414 for client application A 410 includes one less entry than the output in 424 for client application B 420 which includes the additional entry for client application A 410.

The examples described so far include of a single synchronous request. Alternatively, the approach can be adjusted to fit with a programming language used. For example, one alternative variation may be to separate the change request into two parts. The first part only sends the change information request to the change service. In this example, the change service can process this request in queued background tasks. Afterwards, a second request may be sent to the change service, which asks for the very same change information request and all previous ones. If the background task hasn't been finished and there is no result so far, the request might be repeated until either the correct result is retrieved, or a specified timeout is reached.

FIG. 5 illustrates a method 500 of identifying active configuration content in accordance with an example embodiment. For example, the method 500 may be performed by service or other program that is executing on a database node, a cloud platform, a server, a computing system (user device), a combination of devices/nodes, or the like. Referring to FIG. 5, in 510, the method may include receiving a request to change a value of a shared data object stored in a data store. For example, the request may come from a process associated with an application running on a database, a server, a user device, etc. The request may include a value (e.g., integer, string, numerical, etc.) which identifies a change to the shared data object.

In 520, the method may include identifying a queue of the shared data object which stores change requests before processing. For example, the queue may be associated with one data object or multiple data objects. The system may identify the queue and also identify whether any requested changes are currently stored in the queue. In 530, the method may include generating an entry for the request comprising a timestamp of the request, the change in the value, and an identifier of the shared data object. In 540, the method may include storing the generated entry in the queue of the shared data object, where the generated entry is stored in a position of the queue based on the timestamp.

In 550, the queue entry is deleted from the queue. For example, when the queued entry reaches the end of the queue, the application associated with the change request may determine whether or not the queued entry is allowed perform the change on the database when it is allowed. Regardless of whether the change request is performed, the change service may remove the request from the queue. As another example, if a process that requested the change ends or otherwise terminates, the queued request may be removed from the queue and not performed. In this case, all following changes may also not be allowed and will be deleted from the queue.

In some embodiments, the identifying may include identifying at least one other queued entry corresponding to at least one previously received change request for the shared data object, and storing the generated entry of the received change request after the other queued entry in the queue. In some embodiments, the method may further include modifying the shared data object based on the change of the value of the shared data object in the received change request and deleting the generated entry from the queue, in response to all previous change requests in the queue being completed. In some embodiments, the method may further include identifying one or more previous change requests of the shared data object stored in the queue, and transmitting information about the one or more previous change requests to a software application associated with the received change request. In some embodiments, the method may further include receiving a subsequent change request to change the value of the shared data object, and generating a subsequent entry for the subsequently received change request and storing the subsequent entry in the queue.

In some embodiments, the method may further include arranging the received change request in an order in the queue based on timestamps of other change requests for the shared data object that are stored in the queue. In some embodiments, the method may further include assigning the timestamp to the received change request based on a universal time received from an external service. In some embodiments, the method may further include enhancing the assigned timestamp with a counter value to distinguish the timestamp of the received change request with another change request to change the value of the shared data object received at the same time.

In some embodiments, the determining may include determining whether the requested change in the value of the shared data object is capable of being performed based on the current value of the shared data object and a previous change request to the value of the shared data object stored as a previous entry in the queue. In some embodiments, the method may include modifying the shared data object based on the queued request to change the value of the shared data object, in response to all previous change requests in the queue being completed. In some embodiments, the method may further include identifying one or more previous change requests of the shared data object stored in the queue, and transmitting information about the one or more previous change requests to a software application associated with the received request.

In some embodiments, the method may further include receiving a subsequent request to change the value of the shared data object, and determining whether the subsequently requested change in the value of the shared object is capable of being performed based on the current value and the change in value of the previous change request. In some embodiments, the method may further include, in response to determining the subsequently received request is capable of being performed, generating an entry for the subsequently received request and storing the entry for the subsequently received request in the queue. In some embodiments, the method may include arranging the change request in an order in the queue based on timestamps of other change requests for the shared data object that are stored in the queue. In some embodiments, the method may further include assigning the timestamp to the received request, and enhancing the assigned timestamp with a counter value to distinguish the timestamp of the received request with another request to change the value of the shared data object received at the same time.

Figure 6:
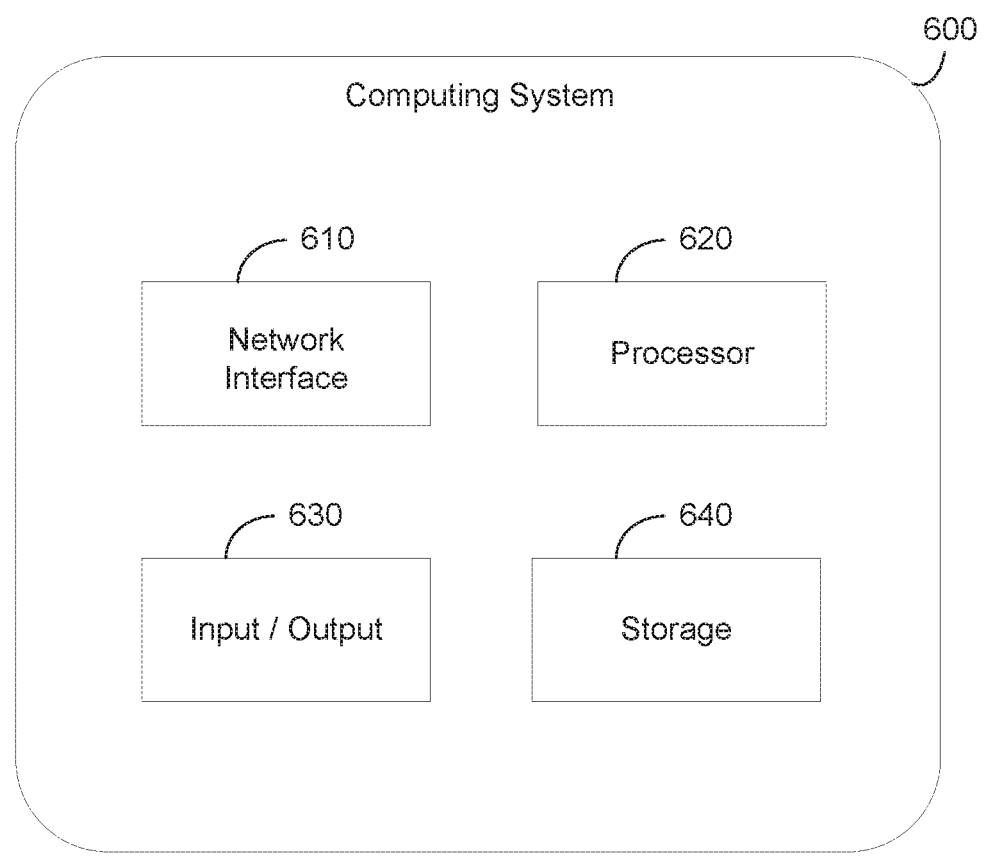
FIG. 6 is a diagram illustrating a computing system for use in the examples herein in accordance with an example embodiment.

FIG. 6 illustrates a computing system 600 that may be used in any of the methods and processes described herein, in accordance with an example embodiment. For example, the computing system 600 may be a database node, a server, a cloud platform, a user device, or the like. In some embodiments, the computing system 600 may be distributed across multiple computing devices such as multiple database nodes. Referring to FIG. 6, the computing system 600 includes a network interface 610, a processor 620, an input/output 630, and a storage device 640 such as an in-memory storage, and the like. Although not shown in FIG. 6, the computing system 600 may also include or be electronically connected to other components such as a display, an input unit(s), a receiver, a transmitter, a persistent disk, and the like. The processor 620 may control the other components of the computing system 600.

The network interface 610 may transmit and receive data over a network such as the Internet, a private network, a public network, an enterprise network, and the like. The network interface 610 may be a wireless interface, a wired interface, or a combination thereof. The processor 620 may include one or more processing devices each including one or more processing cores. In some examples, the processor 620 is a multicore processor or a plurality of multicore processors. Also, the processor 620 may be fixed or it may be reconfigurable. The input/output 630 may include an interface, a port, a cable, a bus, a board, a wire, and the like, for inputting and outputting data to and from the computing system 600. For example, data may be output to an embedded display of the computing system 600, an externally connected display, a display connected to the cloud, another device, and the like. The network interface 610, the input/output 630, the storage 640, or a combination thereof, may interact with applications executing on other devices.

The storage device 640 is not limited to a particular storage device and may include any known memory device such as RAM, ROM, hard disk, and the like, and may or may not be included within a database system, a cloud environment, a web server, or the like. The storage 640 may store software modules or other instructions which can be executed by the processor 620 to perform the method shown in FIG. 5. According to various embodiments, the storage 640 may include a data store having a plurality of tables, partitions and sub-partitions. The storage 640 may be used to store database objects, records, items, entries, and the like. In some embodiments, the storage 640 may be configured to store instructions for executing a change service for controlling access to shared data objects.

According to various embodiments, the network interface 610 may receive a request to change a value of a shared data object. For example, the request may be received from a process being executed by a user in a multi-user environment. The processor 620 may identify a current value of the shared data object stored in a database and determine whether the requested change in the value of the shared data object is capable of being performed based on the current value of the shared data object. For example, the processor 620 may identify any constraints or conditions associated with the data value (e.g., cannot be below $500, etc.) and verify that the requested change in value does not violate any constraints or conditions. Furthermore, in response the requested change being capable of being performed, the processor 620 may generate an entry for the request comprising a timestamp of the request, the change in the value, and an identifier of the shared data object, and store the entry in a queue for processing.

In some embodiments, the storage 640 may implement a queue which can be used to store change requests in a time-based order. The queue may be managed such that the oldest change request is processed next. In some embodiments, the processor 620 may determine whether the requested change in the value of the shared data object is capable of being performed based on the current value of the shared data object and a previous change request to the value of the shared data object stored as a previous entry in the queue. In some embodiments, the processor 620 may be configured to modify the shared data object based on the queued request to change the value of the shared data object, in response to all previous change requests in the queue being completed. In some embodiments, the processor 620 may identify one or more previous change requests of the shared data object stored in the queue, and transmit information about the one or more previous change requests to a software application associated with the received request.

Although the examples herein describe a shared change service managing changes to the value of a shared data object, the change service may be used for other types of data changes. For example, changes to source code of a software program may be managed by the change service which receives various rules/conditions associated with the changes, and stores changes in the queue until they can be processed.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
    a storage configured to store a shared data object that is shared by a plurality of software applications; and
    a processor configured to
        receive, from a first software application, via an application programming interface (API) of a change service, a request to change a value of the shared data object,
        identify a queue of the shared data object which stores change requests before processing based on a key identifier stored in the request received via the API,
        generate an entry for the request comprising a timestamp of the request, the change in the value, and an identifier of the shared data object,
        determine whether the request is acceptable based on a pending change request for the shared data object submitted by a second software application which has an entry that is stored ahead of the entry of the request in the queue, and
        transmit, to the first software application, information about the pending change request of the second software application stored ahead of the entry of the request in the queue.

2. The computing system of claim 1, wherein the processor identifies at least one other queued entry corresponding to at least one previously received change request for the shared data object, and stores the entry of the received change request after the other queued entry in the queue.

3. The computing system of claim 1, wherein the processor is further configured to modify the shared data object based on the change of the value of the shared data object in the received change request and delete the entry of the received change request from the queue, in response to all previous change requests in the queue being completed.

4. The computing system of claim 1, wherein the processor is further configured to receive a subsequent change request to change the value of the shared data object from a third software application, and generate a subsequent entry for the subsequently received change request and store the subsequent entry in the queue after the entry of the received change request.

5. The computing system of claim 1, wherein the processor is further configured to arrange the received change request in an order in the queue based on timestamps of other change requests for the shared data object that are stored in the queue.

6. The computing system of claim 1, wherein the processor is further configured to assign the timestamp to the received change request based on a universal time received from an external service.

7. The computing system of claim 1, wherein the processor is further configured to enhance the assigned timestamp with a counter value to distinguish the timestamp of the received change request with another change request to change the value of the shared data object received at the same time.

8. The computing system of claim 1, wherein the processor is further configured to accept, via the change service, the requested change to the shared data object included in the received change request, prior to modifying a value of the shared data object in response to the received change request, and wait to modify the value of the shared data object based on the timestamp of the received change request.

9. A method comprising:
    storing, via a data store, a shared data object that is shared by a plurality of software applications;
    receiving, from a first software application, via an application programming interface (API) of a change service, a request to change a value of the shared data object;
    identifying a queue of the shared data object which stores change requests before processing based on a key identifier stored in the request received via the API;
    generating an entry for the request comprising a timestamp of the request, the change in the value, and an identifier of the shared data object;
    determining whether the request is acceptable based on a pending change request for the shared data object submitted by a second software application which has an entry that is stored ahead of the entry of the request in the queue; and
    transmitting, to the first software application, information about the pending change request of the second software application stored ahead of the entry of the request in the queue.

10. The method of claim 9, wherein the identifying comprises identifying at least one other queued entry corresponding to at least one previously received change request for the shared data object, and storing the entry of the received change request after the other queued entry in the queue.

11. The method of claim 9, further comprising modifying the shared data object based on the change of the value of the shared data object in the received change request and deleting the entry of the received change request from the queue, in response to all previous change requests in the queue being completed.

12. The method of claim 9, further comprising receiving a subsequent change request to change the value of the shared data object from a third software application, and generating a subsequent entry for the subsequently received change request and storing the subsequent entry in the queue after the entry of the received change request.

13. The method of claim 9, further comprising arranging the received change request in an order in the queue based on timestamps of other change requests for the shared data object that are stored in the queue.

14. The method of claim 9, further comprising assigning the timestamp to the received change request based on a universal time received from an external service.

15. The method of claim 14, further comprising enhancing the assigned timestamp with a counter value to distinguish the timestamp of the received change request with another change request to change the value of the shared data object received at the same time.

16. A non-transitory computer-readable medium storing instructions which when executed by a processor cause a computer to perform a method comprising:

storing, via a data store, a shared data object that is shared by a plurality of software applications;

receiving, from a first software application, via an application programming interface (API) of a change service, a request to change a value of the shared data object;

identifying a queue of the shared data object which stores change requests before processing based on a key identifier stored in the request received via the API;

generating an entry for the request comprising a timestamp of the request, the change in the value, and an identifier of the shared data object;

determining whether the request is acceptable based on a pending change request for the shared data object submitted by a second software application which has an entry that is stored ahead of the entry of the request in the queue; and transmitting, to the first software application, information about the pending change request of the second software application stored ahead of the entry of the request in the queue.

17. The non-transitory computer-readable medium of claim 16, wherein the identifying comprises identifying at least one other queued entry corresponding to at least one previously received change request for the shared data object, and storing the entry of the received change request after the other queued entry in the queue.

18. The non-transitory computer-readable medium of claim 16, wherein the method further comprises modifying the shared data object based on the change of the value of the shared data object in the received change request and deleting the entry of the received change request from the queue, in response to all previous change requests in the queue being completed.

* * * * *